United States Patent
He

(10) Patent No.: US 7,978,692 B2
(45) Date of Patent: Jul. 12, 2011

(54) INTEGRATED CROSS-SWITCHING UNIT AND SERVICE SCHEDULING METHOD THEREOF

(75) Inventor: Jianfei He, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 1177 days.

(21) Appl. No.: 10/583,791

(22) PCT Filed: Dec. 23, 2004

(86) PCT No.: PCT/CN2004/001502
§ 371 (c)(1),
(2), (4) Date: Jun. 21, 2006

(87) PCT Pub. No.: WO2005/062508
PCT Pub. Date: Jul. 7, 2005

(65) Prior Publication Data
US 2007/0258444 A1      Nov. 8, 2007

(30) Foreign Application Priority Data
Dec. 24, 2003   (CN) .......................... 2003 1 0121799

(51) Int. Cl.
*H04L 12/28* (2006.01)

(52) U.S. Cl. ........................................................ 370/389

(58) Field of Classification Search .................. 370/376, 370/375, 280, 294, 395.1, 395.3, 389
See application file for complete search history.

(56) References Cited

U.S. PATENT DOCUMENTS

| | | | |
|---|---|---|---|
| 4,799,237 A | | 1/1989 | Itoh |
| 5,809,021 A | * | 9/1998 | Diaz et al. ...................... 370/364 |
| 6,034,947 A | | 3/2000 | Yoshida et al. |
| 6,621,828 B1 | * | 9/2003 | Field et al. ...................... 370/466 |
| 2002/0075854 A1 | * | 6/2002 | Kumar et al. .................. 370/352 |
| 2003/0179717 A1 | * | 9/2003 | Hobbs et al. ................... 370/254 |
| 2003/0219042 A1 | | 11/2003 | Tosa |
| 2003/0228093 A1 | | 12/2003 | Notani |

FOREIGN PATENT DOCUMENTS

| | | |
|---|---|---|
| CN | 1177246 A | 3/1998 |
| CN | 1199965 | 11/1998 |
| CN | 100428732 C | 10/2008 |
| EP | 1 041 854 | 10/2000 |
| JP | 2003-60603 | 2/2003 |

(Continued)

OTHER PUBLICATIONS

Graber, H., et al. "Multi-Service Switches and the Service Intelligent™ Optical Architecture for SONET/SDH Metro Networks." Bell Labs Technology, Bell Laboratories, Murrey Hill, N.J., U.S. (2003) vol. 8, No. 2 pp. 111-127.

(Continued)

*Primary Examiner* — Man Phan
*Assistant Examiner* — Nourali Mansoury
(74) *Attorney, Agent, or Firm* — Ladas & Parry LLP

(57) ABSTRACT

An integrated cross-switching unit and a service scheduling method thereof are provided. The integrated cross-switching unit includes: a bus identification module, a cross-connecting module, a mapping/de-mapping module, an encapsulation/de-encapsulation module, and a packet scheduling module; the bus identification module identifies service source, transmits service from a line unit to the cross-connecting module and directly sends the data packets from the data service processing unit to the packet scheduling module to implement scheduling; the cross-connecting module implements TDM service cross-connecting, and transmits the data service of the service from the line unit to the packet scheduling module via the mapping/de-mapping module and the encapsulation/de-encapsulation module to implement scheduling. This solution integrates the cross-connecting function and switching function of TDM service and data service in the same unit, reducing system slots and realizing larger-capacity service scheduling.

12 Claims, 3 Drawing Sheets

FOREIGN PATENT DOCUMENTS

JP  2003-188843  7/2003
WO  03/067843  8/2003

OTHER PUBLICATIONS

English Abstract of CN 1199965 dated Nov. 25, 1998.
Patent Abstracts of Japan of 2003-60603 dated Feb. 28, 2003.
Patent Abstracts of Japan of 2003-18843 dated Jul. 4, 2003.
Berger, L., ed., "Generalized Multi-Protocol Label Switching (GMPLS) Signaling Functional Description," Jan. 2003, pp. 1-34 (31 pages), ret. from www.ietfreport.isoc.org Jul. 20, 2006.
English abstract of CN 1633103 A.

* cited by examiner

INTEGRATED CROSS-SWITCHING UNIT AND SERVICE SCHEDULING METHOD THEREOF

FIELD OF THE INVENTION

The present invention relates to cross-connecting and switching technology of TDM (Time Division Multiplexing) service and data service in communication systems.

BACKGROUND OF THE INVENTION

As the data service increases, the conventional SDH (Synchronous Digital Hierarchy) transmission technology also has corresponding advancement. The Next Generation SDH (NG SDH) technology represented by virtual concatenation, LCAS (Link Capacity Adjustment Scheme) and GFP (Generic Framing Procedure) accelerates the evolution of conventional SDH devices mainly-designed for TDM service to the direction of MSTP (Multi-Service Transmission Platform).

In MSTP devices, switching of data service between different boards can be implemented through adding data switching function, and accordingly, the demand of incremental data service can be satisfied.

At present, almost all data switching and TDM cross-connecting are implemented on different boards; some solutions can accomplish data/TDM integrated switching, but these solutions have some problems, the most important one of which is they need line boards to implement identification of data service, and even de-mapping and de-encapsulation; in this way, the virtual concatenation service in different lines can not be supported.

FIG.1 shows a data switching solution of the prior art. In this solution, a data service processing unit transmits the data as required to be switched to a data switching unit via data bus to implement switching; a line unit implements separation of data service and TDM service on TDM (such as SDH/SONET) lines, so that the data service gets to the data switching unit via the data bus to be switched, and the TDM service is crossed by a cross-connecting unit.

The data switching unit may has functions of encapsulating and mapping data service to SDH container, here the data switching unit is connected with the cross-connecting unit by the bus.

SUMMARY OF THE INVENTION

An aspect of the present invention aims to provide an integrated cross-switching unit to integrate the functions of TDM cross-connecting and data switching into the same unit, which reduces the demand of system slots; another embodiment of the present invention aims to provide a service scheduling method using the above integrated cross-switching unit.

The integrated cross-switching unit according to an embodiment of the present invention, used for TDM system comprising an TDM line unit and a data service processing unit, including: a bus identification module, a cross-connecting module, a mapping/de-mapping module, an encapsulation/de-encapsulation module, and a packet scheduling module; wherein the bus identification module transmits the data service and/or TDM service from the TDM line unit to the cross-connecting unit and transmits the data service from the data service processing unit to the packet scheduling module;

the cross-connecting module implements cross-scheduling for time slots of the TDM service, and schedules the time slots corresponding to the data service from the TDM line unit to the mapping/de-mapping module;

the mapping/de-mapping module receives data frames from the cross-connecting module, and implements mapping/-de-mapping for the data from the encapsulation/de-encapsulation module;

the encapsulation/de-encapsulation module receives the data frames from the mapping/de-mapping module, implements data link layer de-encapsulation, and encapsulates the packets from the packet scheduling module;

the packet scheduling module receives the data packets from the encapsulation/de-encapsulation module and/or the bus identification module to implement packet scheduling based on label; transmitting the scheduled data to the data service processing unit via packet bus or to the TDM line unit via the encapsulation/de-encapsulation module, the mapping/de-mapping module and the cross-connecting unit in turn.

Preferably, multiple physical channels are configured between the mapping/de-mapping module and the encapsulation/de-encapsulation module, and between the encapsulation/de-encapsulation module and the packet scheduling module.

Preferably, the multiple physical channels are respectively configured with different encapsulation protocols.

Preferably, for the GFP frames from different physical channels, the encapsulation/de-encapsulation module finds CID field in the extended header of each GFP frame and forwards directly the data frame with the CID field into the corresponding physical channel.

Another aspect of the present invention aims to provide an integrated cross-switching unit, used for TDM system including an TDM line unit and a data service processing unit, including: a bus identification module, a high-order cross-connecting module, a high-order mapping/de-mapping module, a high-order encapsulation/de-encapsulation module, a high-order packet scheduling module, a low-order cross-connecting module, a low-order mapping/de-mapping module, a low-order encapsulation/de-encapsulation module, and a low-order packet scheduling module; wherein the bus identification module transmits the data service and/or TDM service from the TDM line unit to the high-order cross-connecting unit, and transmits the data service from the data service processing unit to the high-order packet scheduling module;

the high-order cross-connecting module schedules the service as required for low-order processing to the low-order cross-connecting module, implements cross-scheduling for time slots of high-order TDM service, and schedules the time slots corresponding to the high-order data service from the TDM line unit to the high-order mapping/de-mapping module;

the low-order cross-connecting module implements cross-scheduling for time slots of low-order TDM service, and schedules the time slots corresponding to low-order data service from the TDM line unit to the low-order mapping/de-mapping module;

the high-order and low-order mapping/de-mapping modules receive the data frames from the high-order and low-order cross-connecting modules correspondingly, and implement mapping-/de-mapping for the data from the high-order and low-order encapsulation/de-encapsulation modules respectively;

the high-order and low-order encapsulation/de-encapsulation modules receive the data frames from the high-order and low-order mapping/de-mapping modules correspondingly, implement data link layer de-encapsulation, and encapsulate the packets from the high-order and low-order packet scheduling modules;

the high-order packet scheduling module receives the data packets from the high-order encapsulation/de-encapsulation module and/or the bus identification module and implements packet scheduling based on label; transmitting the scheduled data to the data service processing unit via packet bus or to the TDM line unit via the high-order encapsulation/de-encapsulation module, the high-order mapping/de-mapping unit and the high-order cross-connecting module in turn;

the low-order packet scheduling module receives the data packets from the low-order encapsulation/de-encapsulation module and implements packet scheduling based on label; transmitting the scheduled data to the TDM line unit via the low-order encapsulation/de-encapsulation module, the low-order mapping/de-mapping unit and the low-order cross-connecting module in turn. The low-order packet scheduling module receives the data packets from the low-order encapsulation/de-encapsulation module and implements packet scheduling based on label; the data after scheduling are transmitted to the data service processing unit through Packet Bus or get to the TDM Unit through low-order encapsulation/de-encapsulation module, low-order Mapping/De -mapping Unit and low-order cross-connecting module in turn.

A further aspect of the present invention aims to provide a service scheduling method, including the steps of:

A) the bus identification module transmitting the data service and/or TDM service from the TDM line unit to the cross-connecting module, and going to step B); transmitting the data service from the data service processing unit to the packet scheduling module, and going to step C);

B) the cross-connecting module implementing cross-scheduling for time slots of the TDM service, and transmitting the scheduled data to the TDM line unit; or scheduling the time slots corresponding to the data service from the TDM line unit to the mapping/de-mapping module, the encapsulation/de-encapsulation module receiving the data service from the mapping/de-mapping module and transmitting the data service to the packet scheduling module, and going to step C);

C) the packet scheduling module implementing packet scheduling for the data service; transmitting the scheduled data to the data service processing unit via packet bus, or to the TDM line unit via the encapsulation/de-encapsulation module, the mapping/de-mapping module and the cross-connecting module in turn.

Preferably, the bus identification module reports the slot number corresponding to the data service processing unit and unit type of the data service processing unit to the control unit via the data service processing unit, and identifies the type of the bus connected with the processing unit as backplane packet bus to identify service source.

Preferably, the TDM line unit and the data service processing unit copy the service to a first integrated cross-switching unit and a second integrated cross-switching unit which have completely same function and structure to implement the same service scheduling procedure; if the first integrated cross-switching unit and the second integrated cross-switching unit are both normal, the TDM line unit and the data service processing unit receive the same service streams from the first integrated cross-switching unit and the second integrated cross-switching unit , and select either of them to implement a processing based on the service streams; if either of the first integrated cross-switching unit and the second integrated cross-switching unit goes wrong, the faulted integrated cross-switching unit reports to the control unit, and the control unit instructs the TDM line unit and the data service processing unit to select the service stream of the normal integrated cross-switching unit.

Preferably, the TDM line unit and the data service processing unit copy the service to the first integrated cross-switching unit and the second integrated cross-switching unit which have completely same function and structure to implement the same service scheduling procedure; the TDM line unit and the data service processing unit receive the same service streams from the first integrated cross-switching unit and the second integrated cross-switching unit, and determine whether the two service streams are normal, select either of them and implement a processing based on the service streams if the two service streams are both normal; if either of them is abnormal, select the normal service stream.

Preferably, the TDM line unit and the data service processing unit allocate the service to the first integrated cross-switching unit and the second integrated cross-switching unit which have completely same function and structure to implement service scheduling; if the first integrated cross-switching unit and the second integrated cross-switching unit are both normal, the TDM line unit and the data service processing unit receive the service streams from the first integrated cross-switching unit and the second integrated cross-switching unit to implement a processing based on the service streams; if either of the first integrated cross-switching unit and the second integrated cross-switching unit goes wrong, the faulted integrated cross-switching unit reports to the control unit, and the control unit instructs the TDM line unit and the data service processing unit to switch the service allocated to the faulted integrated cross-switching unit to the normal integrated cross-switching unit.

Preferably, the TDM line unit and the data service processing unit allocate the service to the first integrated cross-switching unit and the second integrated cross-switching unit which have completely same function and structure to implement service scheduling; the TDM line unit and the data service processing unit receive the service streams from the first integrated cross-switching unit and the second integrated cross-switching unit and determines whether the service streams are normal; if either of the service streams is abnormal, switch the service of the integrated cross-switching unit corresponding to the abnormal service stream to the normal integrated cross-switching unit.

Preferably, the service allocated to the first integrated cross-switching unit and the second integrated cross-switching unit has priority; when either of the integrated cross-switching units goes wrong and needs service switching, the high-priority service can substitute the low-priority service under processing.

Compared with the prior art, the advantageous effects of the present invention include: first, an embodiment of the present invention provides an integrated cross-switching unit in a system, which saves system slots using the integrated cross-switching unit under the precondition of implementing the same data switching. Secondly, since an embodiment of the present invention includes a bus identification module for identifying service source, and a cross-connecting module can implement separation of TDM service and data service, so the line unit and the data service processing unit can be simplified and support virtual concatenation.

Embodiments of the present invention can provide service scheduling on GFP level without de-encapsulation, reducing scheduling time and implementation cost.

Embodiments of the present invention can realize multi-granularity mapping/de-mapping;

Embodiments of the present invention can support multiple encapsulation protocols and respectively configure each channel with a different encapsulation protocol.

Embodiments of the present invention also can reduce complexity of the data service processing unit, when the access quantity of service is relatively large, it can reduce the total cost of the system effectively.

It is easier for embodiments of the present invention to realize relatively large service scheduling capacity through separation of high-order service and low-order service.

Embodiments of the present invention can directly connect the packet service from the service processing unit to the packet scheduling unit to implement scheduling through identification of backplane bus.

DETAILED DESCRIPTION OF THE EMBODIMENTS

Figure 1:
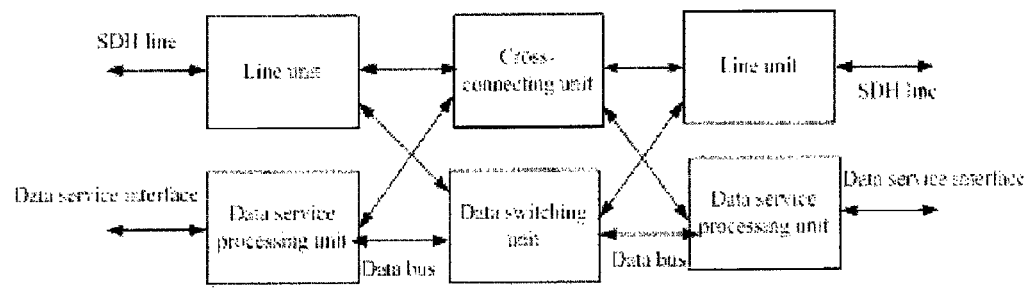
FIG. 1 is a schematic diagram illustrating a service scheduling solution in the prior art.
Figure 2:
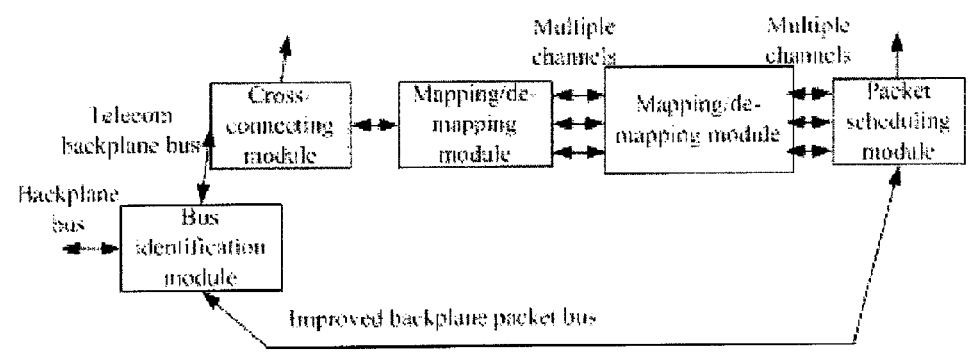
FIG. 2 is a block diagram illustrating the structure of an integrated cross-switching unit according to an embodiment of the present invention.

FIG. 2 is a block diagram illustrating the structure of an integrated cross-switching unit according to an embodiment of the present invention. The integrated cross-switching unit includes: a bus identification module, a cross-connecting module, a mapping/de-mapping module, an encapsulation/de-encapsulation module, and a packet scheduling module; the bus identification module is connected with a conventional TDM (such as SDH/SONET) line unit and a data service processing unit, for identifying service source and transmitting the service to the corresponding following parts to implement scheduling.

For conventional TDM service, the cross-connecting module schedules TDM data of one time slot to another time slot through space-division or time-division, implementing cross-scheduling; for data service from the conventional TDM (such as SDH/SONET) line unit, which is probably mixed with TDM service, the time slots corresponding to the data service are scheduled to the mapping/de-mapping module by the cross-connecting module, pass the mapping/de-mapping module and the encapsulation/de-encapsulation module in turn, and get to the packet scheduling module, implementing final scheduling.

The service from the data service processing unit enters the integrated cross-switching unit via backplane packet bus. The bus identification module of the integrated cross-switching unit identifies the backplane packet bus according to the type of the single board plugging in the slot corresponding to the main control unit, and extracts the data packets from the bus, and transmits them to the packet scheduling module to implement scheduling. The scheduled data can be transmitted to the data service processing unit via the packet bus, or can get to the backplane TELECOM bus through the mapping/de-mapping module, the encapsulation/de-encapsulation module and the cross-connecting module and then get to the line unit, in order to implement the processing of packet over SDH.

The mapping/de-mapping module is used to load data frames into a virtual container or a virtual container group, or extracts data frames from a virtual container or a virtual container group. Virtual container group refers to multiple virtual containers bound together through adjacent concatenations or virtual concatenations. In the embodiment of the present invention, the mapping/de-mapping module of the integrated cross-switching unit supports multi-granularity virtual container or virtual container group, so that service scheduling between virtual containers or virtual container groups with different granularity can be implemented, for example, from VC12 to VC3. For SDH, the granularity of virtual container includes but is not limited to VC12, VC3 and VC4. For SONET (synchronous optical network), the granularity of virtual container includes but is not limited to VT1.5, STS-1, STS-3C etc.

When virtual concatenation is adopted, the mapping/de-mapping module also implements LCAS (Link Capacity Adjustment Scheme) protocol.

The encapsulation/de-encapsulation module is used to implement data link layer encapsulation/de-encapsulation of data frames. The data link layer encapsulation is performed for frame alignment.

In the embodiment of the present invention, the encapsulation/de-encapsulation module of the integrated cross-switching unit supports multiple encapsulation protocols including: GFP (Generic Framing Procedure), LAPS (Link Access Procedure-SDH), HDLC (High-level Data Link Control) etc., so that scheduling of service with different encapsulations can be implemented. Different encapsulation protocols can be respectively configured for each channel.

Besides common encapsulation/de-encapsulation function, for data streams of linear frames adopting GFP, the encapsulation/de-encapsulation module can implement service scheduling based on CID information in the extended header of GFP frame. That is, for GFP frames from different physical channels (an individual virtual container or virtual container group), the encapsulation/de-encapsulation module can find CID field in the extended header of GFP frame, and forwards the data frames with the CID to corresponding physical channel (an individual virtual container or virtual container group) according to network configuration. This scheduling mechanism can save cost of encapsulation/de-encapsulation and improve speed of processing.

The packet scheduling module implements packet scheduling based on label. For a data service frames (de-encapsulating the GFP frame) from different channels, the packet scheduling module finds the label information in the data service frames, and forwards the data frames with the labels into the corresponding channels according to network configuration. Here the label information can be configured differently according to different channels and can exist in different positions in the data frames according to different protocols. The label information can be found according to pre-configured or default offset position. Particularly, the label information can be 802.1Q VLAN label, q-in-q stacked VLAN label, or MPLS L2 VPN label.

Figure 3:
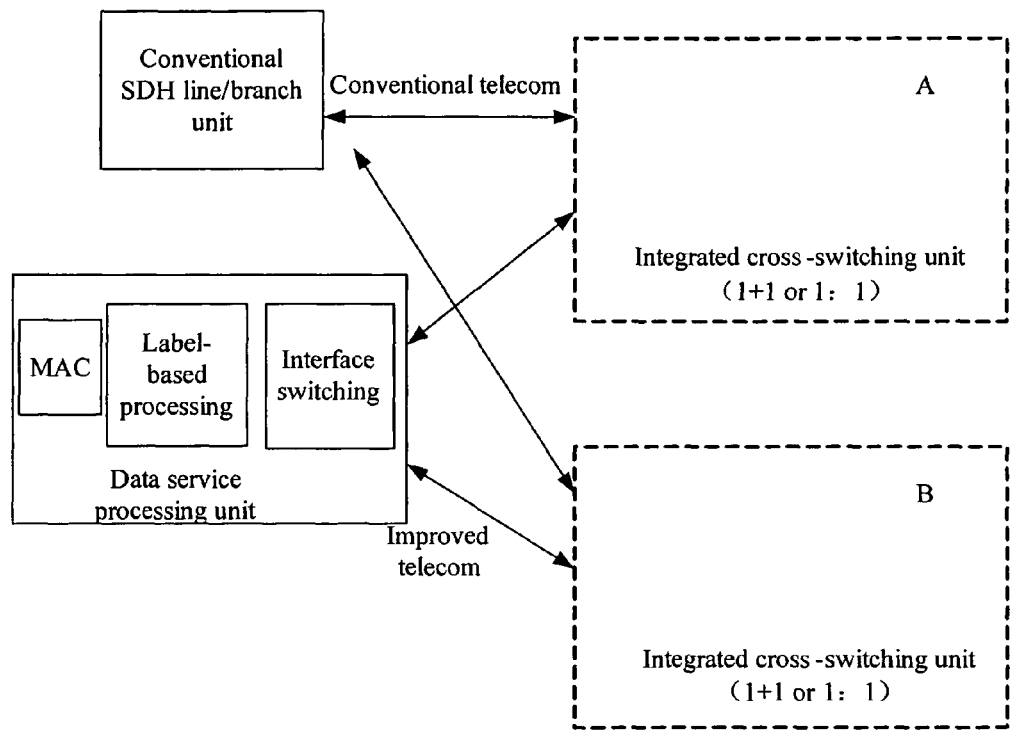
FIG. 3 is a schematic diagram illustrating the connection of implementing 1+1 or 1:1 protection of the integrated cross-switching unit according to an embodiment of the present invention.

Since the position of the integrated cross-switching unit in the network is very important, an embodiment of the present invention aims to provide a 1+1 or 1:1 protection, as shown in FIG. 3.

When 1+1 protection is provided, the line unit and the data service processing unit copy the service to the integrated cross-switching units A and B, so the service received, processed and transmitted by the integrated cross-switching units A and B are completely same. The line unit and the data service processing unit receive service streams from the integrated cross-switching units A and B, and select either of them to perform a processing based on the service streams.

When one of the integrated cross-switching units A and B goes wrong, supposing the faulted one is A, then the integrated cross-switching unit A reports to the control unit, and the control unit instructs the line unit and the data service processing unit to select the service streams from the integrated cross-switching unit B. In a different system, the line unit or the data service processing unit can determine the signal is normal or wrong at its receiving end by itself and select the normal one. Here the breakdown includes: performance deterioration or alarm of virtual container overhead detected by the mapping/de-mapping module in the integrated cross-switching unit, performance deterioration or alarm in encapsulation detected by the encapsulation/de-encapsulation module, performance deterioration or alarm of data frames detected by the packet scheduling module, and failure of circuit such as unit power supply, clock etc.

When 1:1 protection is provided, the service received, processed and transmitted by the integrated cross-switching units A and B are different from each other when they work normally, and moreover the service possibly has priority. When one of the integrated cross-switching units A and B goes wrong, supposing the faulted one is A, then the integrated cross-switching unit A reports to the control unit, and the control unit instructs the line unit and the data service processing unit to switch the service as required to be protected transmitted to A to the service scheduling unit B, and the switched service possibly substitutes for part of the service being processed in B. Which service in B can be substituted is pre-configured, and it may be the service with low priority. In a different system, the line unit or the data service processing unit can determine the signal is normal or wrong at its receiving end by itself and select the normal one. Here the breakdown includes: performance deterioration or alarm of virtual container overhead detected by the mapping/de-mapping module in the integrated cross-switching unit, performance deterioration or alarm in encapsulation detected by the encapsulation/de-encapsulation module, performance deterioration or alarm of data frames detected by the packet scheduling module, and failure of circuit such as unit power supply, clock etc.

Figure 4:
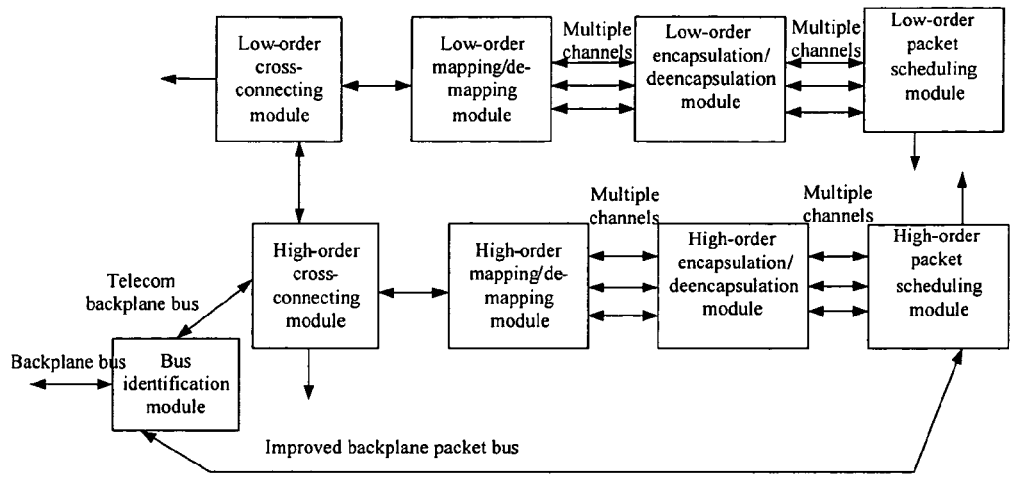
FIG. 4 is a block diagram illustrating the structure of an integrated cross-switching unit according to another embodiment of the present invention.

Another embodiment of the present invention provides an integrated cross-switching unit, comprising: a bus identification module, a high-order cross-connecting module, a low-order cross-connecting module, a high-order mapping/de-mapping module, a low-order mapping/de-mapping module, a high-order encapsulation/de-encapsulation module, a low-order encapsulation/de-encapsulation module, a high-order packet scheduling module, and a low-order packet scheduling module. The structure of the integrated cross-switching unit is shown as FIG. 4. The capacity of cross-switching is expanded through separation of the high-order and low-order cross-switching. The high-order cross-connecting module schedules the service as required for low-order processing to the low-order cross-connecting module, which implements scheduling of low-order service, and scheduling the service as required for packet scheduling to the low-order mapping/de-mapping module. And the service is in turn processed by the encapsulation/de-encapsulation module and/or the packet scheduling module. The high-order cross-connecting module implements scheduling of high-order service, and the particular procedure of scheduling is as the same as the procedure implemented by the structure in FIG. 2, which will not be repeated here. For SDH and SONET, high-order service and low-order service have different definitions, and in general, the high-order service includes speeds of VC3 and VC4; while the low-order service includes speeds of VC3, VC12, VT1.5, etc.

Figure 5:
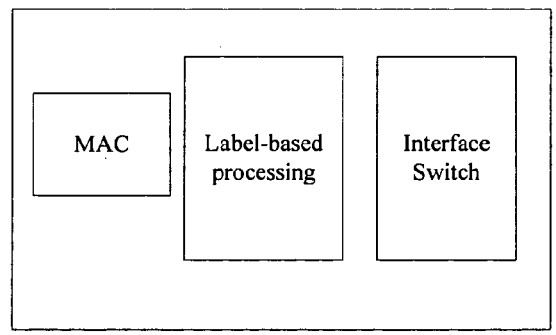
FIG. 5 is a block diagram illustrating the internal structure of the date service processing unit according to an embodiment of the present invention.

With the provision of the integrated cross-switching unit, the data service processing unit can be made relatively simple, i.e., only adaptation between the service and the backplane packet bus and addition of label information as required for switching should be implemented. While the complicated service scheduling function, encapsulation function and mapping function are implemented by the integrated cross-switching unit. The block diagram of the data service processing unit is shown as FIG. 5. In different applications, other complicated functions can be added in the data service processing unit.

Here the data service processing unit includes but is not limited to Ethernet service processing unit, SAN service processing unit, ATM service processing unit, FR service processing unit, POS service processing unit, etc.

The above description is preferred embodiments of the present invention, but does not intend to limit the protection scope of the present invention. It is apparent that various modifications and substitution disclosed within the scope of the present invention by those skilled in the art should be within the disclosed scope of the present invention. Therefore, the protection scope of the present invention should be defined by the appended claims.

What is claimed is:

1. An integrated cross-switching unit, connected with a TDM (Time Division Multiplexing) line board and a data service processing unit, wherein the integrated cross-switching unit comprises:
    a bus identification module;
    a cross-connecting module;
    a mapping/de-mapping module;
    an encapsulation/dc-encapsulation module coupled with the mapping/de-mapping module via at least one physical channel; and
    a packet scheduling module; wherein
    the bus identification module identifies a traffic source by reporting a slot number corresponding to the data service processing unit and a unit type of the data service processing unit to a control unit via the data service processing unit and by identifying the type of a bus connected with the data service processing unit as a packet bus, transmits traffic from the TDM line board to the cross-connecting unit, and transmits packets from the data service processing unit to the packet scheduling module;
    the cross-connecting module schedules time slots of the traffic from the TDM line board;
    the mapping/de-mapping module de-maps the traffic from the cross-connecting module, and to map traffic from the encapsulation/de-encapsulation module;
    the encapsulation/de-encapsulation module de-encapsulates the traffic from the mapping/de-mapping module, and encapsulates the packets from the packet scheduling module; and
    the packet scheduling module schedules the packets from the encapsulation/de-encapsulation module and/or the bus identification module, and transmits the scheduled packets to the data service processing unit via the packet bus or to the TDM line board via the encapsulation/de-encapsulation module, the mapping/de-mapping module and the cross-connecting module in turn; wherein for GFP (Generic Framing Procedure) frames from different physical channels, the encapsulation/de-encapsulation module finds a CID (Channel ID) field in an extended header of each GFP frame and directly forwards the data GFP frame with the CID field into a corresponding physical channel.

2. The integrated cross-switching unit according to claim 1, wherein a plurality of physical channels are configured between the mapping/de-mapping module and the encapsulation/de-encapsulation module, and between the encapsulation/de-encapsulation module and the packet scheduling module.

3. The integrated cross-switching unit according to claim 2, wherein the plurality of physical channels are configured with different encapsulation protocols respectively.

4. The integrated cross-switching unit according to claim 1, wherein the TDM line board is a synchronous digital hierarchy or synchronous optical network line board.

5. An integrated cross-switching unit, which is connected with a TDM (Time Division Multiplexing) line unit board and a data service processing unit, wherein the integrated cross-switching unit comprises:
a bus identification module;
a high-order cross-connecting module;
a high-order mapping/de-mapping module;
a high-order encapsulation/de-encapsulation module coupled with the high-order mapping/de-mapping module via at least one physical channel;
a high-order packet scheduling module;
a low-order cross-connecting module;
a low-order mapping/de-mapping module;
a low-order encapsulation/de-encapsulation module; and
a low-order packet scheduling module; wherein
the bus identification module identifies a traffic source by reporting a slot number corresponding to the data service processing unit and a unit type of the data service processing unit to a control unit via the data service processing unit and by identifying the type of a bus connected with the data service processing unit as a packet bus, transmits traffic from the TDM line board to the high-order cross-connecting module, and transmits packets from the data service processing unit to the high-order packet scheduling module;
the high-order cross-connecting module schedules the traffic as required for low-order processing to the low-order cross-connecting module, and performs high-order scheduling on time slots of the traffic from the TDM line board;
the low-order cross-connecting module, performs low-order scheduling on time slots of the traffic from the TDM line board;
the high-order and low-order mapping/de-mapping modules de-map the traffic from the high-order and low-order cross-connecting modules correspondingly, and to map traffic from the high-order and low-order encapsulation/de-encapsulation modules respectively;
the high-order and low-order encapsulation/de-encapsulation modules de-encapsulate the traffic from the high-order and low-order mapping/de-mapping modules correspondingly, and encapsulate the packets from the high-order and low-order packet scheduling modules respectively;
the high-order packet scheduling module schedules the packets from the high-order encapsulation/de-encapsulation module and/or the bus identification module and to transmit the scheduled packets to the data service processing unit via packet bus or to the TDM line board via the high-order encapsulation/de-encapsulation module, the high-order mapping/de-mapping unit, and the high-order cross-connecting module in turn;
the low-order packet scheduling module schedules the packets from the low-order encapsulation/de-encapsulation module and to transmit the scheduled packets to the TDM line board via the low-order encapsulation/de-encapsulation module, the low-order mapping/de-mapping unit, and the low-order cross-connecting module in turn; wherein
for GFP (Generic Framing Procedure) frames from different physical channels, the low-order encapsulation/de-encapsulation module finds a CID (Channel ID) field in an extended header of each GFP frame and directly forwards the data GFP frame with the CID field into a corresponding physical channel.

6. A traffic scheduling method, comprising the steps of:
A) a bus identification module identifying a traffic source by reporting a slot number corresponding to a data service processing unit and a unit type of the data service processing unit to a control unit via the data service processing unit and by identifying the type of a bus connected with the data service processing unit as a packet bus, transmitting traffic from a TDM (Time Division Multiplexing) line board to a cross-connecting module, and going to step B); and transmitting packets from the data service processing unit to a packet scheduling module via the packet bus, and going to step E);
B) the cross-connecting module scheduling the traffic from the TDM line board, and going to step E);
C) a mapping/de-mapping module de-mapping the traffic from the cross-connecting module and mapping traffic from an encapsulation/de-encapsulation module coupled with the mapping/de-mapping module via at least one physical channel;
D) the encapsulation/de-encapsulation module de-encapsulating the traffic from the mapping/de-mapping module and encapsulating the packets from the packet scheduling module; and
E) the packet scheduling module scheduling the packets from the encapsulation/de-encapsulation module and/or the bus identification module, and transmitting the scheduled packets to the data service processing unit via the packet bus, or to the TDM line board via the encapsulation/de-encapsulation module, the mapping/de-mapping module, and the cross-connecting module in turn;
for GFP (Generic Framing Procedure) frames from different physical channels, the high-order encapsulation/de-encapsulation module or low-order encapsulation/de-capsulation module finds a CID (Channel ID) field in an extended header of each GFP frame and directly forwards the data GFP frame with the CID field into a corresponding physical channel.

7. The method according to claim 6, further comprising:
the TDM line board and the data service processing unit copying the traffic to a first integrated cross-switching unit and a second integrated cross-switching unit which have the same function and structure to implement the same scheduling;
if the first integrated cross-switching unit and the second integrated cross-switching unit are both normal, the TDM line board and the data service processing unit receiving the traffic from the first integrated cross-switching unit and the second integrated cross-switching unit, and selecting either of the traffic to implement a processing;

if either of the first integrated cross-switching unit and the second integrated cross-switching unit goes wrong, the faulted integrated cross-switching unit reporting to the control unit, and the control unit instructing the TDM line board and the data service processing unit to select the traffic of the normal integrated cross-switching unit.

8. The method according to claim 6, further comprising:
the TDM line board and the data service processing unit copying the traffic to a first integrated cross-switching unit and a second integrated cross-switching unit which have the same function and structure to implement the same scheduling;
the TDM line board and the data service processing unit receiving the traffic from the first integrated cross-switching unit and the second integrated cross-switching unit, determining whether the two traffic is normal, and selecting either of the traffic to implement a processing if the two traffic is both normal; if either of the traffic is abnormal, selecting the normal traffic.

9. The method according to claim 6, further comprising:
the TDM line board and the data service processing unit allocating the traffic to a first integrated cross-switching unit and a second integrated cross-switching unit which have the same function and structure to implement scheduling;
if the first integrated cross-switching unit and the second integrated cross-switching unit are both normal, the TDM line board and the data service processing unit receiving the traffic from the first integrated cross-switching unit and the second integrated cross-switching unit to implement a processing; if either of the first integrated cross-switching unit and the second integrated cross-switching unit goes wrong, the faulted integrated cross-switching unit reporting to a control unit, and the control unit instructing the TDM line board and the data service processing unit to switch the traffic allocated to the faulted integrated cross-switching unit to the normal integrated cross-switching unit.

10. The method according to claim 6, further comprising:
the TDM line board and the data service processing unit allocating the traffic to a first integrated cross-switching unit and a second integrated cross-switching unit which have the same function and structure to implement scheduling;
the TDM line board and the data service processing unit receiving the traffic from the first integrated cross-switching unit and the second integrated cross-switching unit and determining whether the traffic is normal;
if either of the traffic is abnormal, switch the traffic of the integrated cross-switching unit corresponding to the abnormal traffic to the normal integrated cross-switching unit.

11. The method according to claim 8, wherein the traffic allocated to the first integrated cross-switching unit and the second integrated cross-switching unit has priorities; when either of the integrated cross-switching units goes wrong and needs traffic switching, high-priority traffic substitutes low-priority traffic under processing.

12. The method according to claim 9, wherein the service allocated to the first integrated cross-switching unit and the second integrated cross-switching unit has priority; when either of the integrated cross-switching units goes wrong and needs service switching, high-priority traffic can substitute low-priority traffic under processing.

* * * * *